US012798448B2

(12) United States Patent
Kwon et al.

(10) Patent No.: US 12,798,448 B2
(45) Date of Patent: Nov. 17, 2026

(54) UPPER RAIL DEVICE FOR SEAT OF VEHICLE

(71) Applicants: Hyundai Motor Company, Seoul (KR); Kia Corporation, Seoul (KR); Dae Won San Up Co., Ltd., Ansan (KR)

(72) Inventors: Tae Jun Kwon, Incheon (KR); Hyun Ko, Suwon (KR); Hyun Kyu Moon, Incheon (KR); Tae Su Kim, Yongin (KR); Min Seok Kim, Hwaseong (KR); Yeon Jin Jeon, Daegu (KR); Sang Do Park, Seoul (KR); Sung Hyun Hwang, Incheon (KR); Sun Ho Hur, Seoul (KR); Tae Hyung Kim, Siheung (KR); Hwan Seok Kim, Siheung (KR)

(73) Assignees: Hyundai Motor Company, Seoul (KR); Kia Corporation, Seoul (KR); Dae Won San Up Co., Ltd., Ansan (KR)

( * ) Notice: Subject to any disclaimer, the term of this patent is extended or adjusted under 35 U.S.C. 154(b) by 353 days.

(21) Appl. No.: 18/618,830

(22) Filed: Mar. 27, 2024

(65) Prior Publication Data

US 2025/0074263 A1 Mar. 6, 2025

(30) Foreign Application Priority Data

Sep. 4, 2023 (KR) ........................ 10-2023-0116927

(51) Int. Cl.
*B60N 2/07* (2006.01)
*B60N 2/02* (2006.01)

(52) U.S. Cl.
CPC ....... *B60N 2/0722* (2013.01); *B60N 2/02258* (2023.08)

(58) Field of Classification Search
CPC ..... B60N 2/0722; B60N 2/06; B60N 2/02258
(Continued)

(56) References Cited

U.S. PATENT DOCUMENTS 4,842,232 A * 6/1989 Pipon .................. B60N 2/1832 297/344.1
7,036,883 B1 * 5/2006 Thompson ............... B60N 2/14 297/344.24

(Continued)

FOREIGN PATENT DOCUMENTS

DE 102009033494 A1 * 1/2011 ............... B60N 2/14
KR 10-2495195 B1 2/2023
KR 10-2574471 B1 9/2023

*Primary Examiner* — Jose V Chen
(74) *Attorney, Agent, or Firm* — Fox Rothschild LLP

(57) ABSTRACT

An upper rail device for a seat of a vehicle includes: a lower plate in which a slot is formed, a drive housing mounted on the lower plate, a drive support that passes through the slot for insertion into a curved movement path of a lower rail, a motor with a reducer mounted on an upper surface of the drive housing, a drive shaft connected to an output portion of the reducer, a drive gear mounted on a lower end portion of the drive shaft and engaged with a driven gear mounted within the curved movement path of the lower rail. The upper rail device may be fastened to enable sliding movement along the curved movement path of the lower rail so that the seat can be moved in a diagonal or oblique direction depending on various purposes, which can improve a seat position movement adjustment.

18 Claims, 10 Drawing Sheets

(58) Field of Classification Search
USPC .......................................... 297/344.1, 344.11
See application file for complete search history.

(56) References Cited

U.S. PATENT DOCUMENTS

| | | | | |
|---|---|---|---|---|
| 2004/0195886 | A1* | 10/2004 | Beatty | B60N 2/938 297/344.21 |
| 2014/0159436 | A1* | 6/2014 | Iacobucci | B60N 2/995 297/75 |
| 2014/0167471 | A1* | 6/2014 | Haller | B60N 2/508 297/344.22 |
| 2014/0197658 | A1* | 7/2014 | Becker | B60N 2/1695 296/65.15 |
| 2015/0375638 | A1* | 12/2015 | Farooq | B60N 2/06 296/65.18 |
| 2017/0297721 | A1* | 10/2017 | Davis | B60N 2/02246 |
| 2020/0001748 | A1* | 1/2020 | Antoniuk | B60N 2/02258 |
| 2020/0101871 | A1* | 4/2020 | Garotte | B60N 2/06 |
| 2021/0070198 | A1* | 3/2021 | Haller | B60N 2/14 |
| 2023/0415617 | A1* | 12/2023 | Shioya | B60N 2/14 |
| 2024/0034201 | A1* | 2/2024 | Fisher, III | B60N 2/02246 |
| 2024/0359598 | A1* | 10/2024 | Kim | B60N 2/14 |
| 2024/0391364 | A1* | 11/2024 | Mochizuki | B60N 2/14 |
| 2024/0424960 | A1* | 12/2024 | Uno | B60N 2/14 |
| 2025/0018839 | A1* | 1/2025 | Kim | B60N 2/68 |
| 2025/0033535 | A1* | 1/2025 | Kwon | B60N 2/0745 |
| 2025/0118991 | A1* | 4/2025 | Yamamoto | H02J 50/10 |

* cited by examiner

UPPER RAIL DEVICE FOR SEAT OF VEHICLE

CROSS-REFERENCE TO RELATED APPLICATION

This application claims under 35 U.S.C. § 119 (a) the benefit of Korean Patent Application No. 10-2023-0116927 filed on Sep. 4, 2023, the entire contents of which are incorporated herein by reference.

BACKGROUND

(a) Technical Field

The present disclosure relates to an upper rail device for a seat of a vehicle, more particularly, to the upper rail device that is slidably fastened to a lower rail with a curved movement path to facilitate seat position adjustment.

(b) Description of the Related Art

Generally, a seat of a vehicle has a structure that includes a seat cushion to support the lower body, a seat back for supporting the upper body, and a headrest to support the neck and head. In addition, various seat position adjustment mechanisms may change a seat position to accommodate an occupant's body type and seating posture.

For example, the seat position adjustment mechanisms include a seat rail mechanism for adjusting front and rear positions of the seat, a seat height adjustment mechanism for adjusting a seat height, and a seat back reclining mechanism for adjusting an angle of a seat back.

Generally, the seat rail mechanism includes a rectilinear lower rail which is fixedly mounted on a floor channel to slide the seat in a front or rear direction, and an upper rail which is inserted into and fastened to the lower rail to be movable in a front-rear direction. In addition, a seat cushion frame, which is a skeleton of a seat cushion, is mounted on the upper rail.

Thus, when the upper rail slides in the front or rear direction along the lower rail, the seat is also moved forward or backward together with the upper rail so that a front and rear position of the seat can be adjusted.

However, since the existing seat rail is formed in a structure which allows only rectilinear movement in the front or rear direction, there is a disadvantage in that adjustability of the seat is reduced.

In other words, since the existing seat rail can be rectilinearly moved only in the front-rear direction, when there is a need to move the seat in a diagonal or oblique direction depending on various purposes, it has a disadvantage of not being able to meet such a need.

SUMMARY

In one aspect, the present disclosure provides a seat of a vehicle including an upper rail device, which is fastened to enable slide movement along a curved movement path of a lower rail for the seat so that the seat can be moved in a diagonal or oblique direction depending on various purposes, thereby improving the degree of freedom in a seat position movement adjustment.

Objectives of the present disclosure are not limited to the above-described objectives. The objectives of the present disclosure will become more apparent from the following description and will be implemented by the means described in the appended claims and a combination thereof.

In an exemplary embodiment, the present disclosure provides an upper rail device for a seat of a vehicle including: a lower plate in which at least a slot is formed; a drive housing movably mounted on an upper surface of the lower plate; a drive support formed to protrude from a bottom portion of the drive housing and configured to pass through the slot to be slidably inserted into a curved movement path of a lower rail; a motor provided in a structure with a reducer, the motor being mounted on an upper surface of the drive housing; a drive shaft connected to an output portion of the reducer; and a drive gear mounted on a lower end portion of the drive shaft and engaged with a driven gear mounted within the curved movement path of the lower rail.

Preferably, the slot of the lower plate may be formed as a curved slot which is long in a front-rear direction and convex outward.

In addition, guide rollers may be mounted on both sides of the drive housing to be rolled in close contact with a periphery of the slot on the upper surface of the lower plate.

In addition, a curved rail groove with a length defining a movement trajectory of the guide roller may be formed on the periphery of the slot on the upper surface of the lower plate.

Preferably, the drive gear mounted on the lower end portion of the drive shaft may employ a pinion, and the driven gear mounted within the curved movement path of the lower rail may employ a rack gear.

In addition, a support roller, which is inserted into to be rolled in a roller insertion space formed within the curved movement path of the lower rail, may be mounted on an outer surface of a lower end of the drive support.

In addition, a slider mounting groove, into which the slider is inserted and mounted, may be formed on an inner surface of a lower end of the drive support.

In particular, the slider may include a slide housing provided in a structure including a first slide groove which is open outward to allow a sliding guide formed in the curved movement path of the lower rail to be inserted and which passes through the slide housing in a front-rear direction so that the slide housing is inserted into and mounted in a slider mounting groove of the drive support, and a slide bush provided in a structure including a second slide groove which is open outward to allow the sliding guide to be inserted and which is open in the front-rear direction so that the slide bush is rotatably inserted into and mounted in the first slide groove in a left-right direction.

In addition, a concave rotation guide groove may be formed on an inner wall surface of the first slide groove of the slide housing, and a convex rotation block may be formed to protrude from an inner surface of the slide bush to be rotatably inserted into the rotation guide groove in the left-right direction.

In addition, a power supply brush, which is conductively brought into contact with a bus bar mounted within the curved movement path of the lower rail to supply power to the motor, may be mounted on the bottom portion of the lower plate.

In addition, a brush rail may be mounted at the bottom portion of the lower plate in a width direction, and a slide stage may be formed above the power supply brush to be slidably engaged with the brush rail.

In addition, a guide groove may be formed at a lower portion of the power supply brush to allow a sliding guide formed within the curved movement path of the lower rail to be inserted.

The upper rail device according to the present disclosure may further include a seat swivel device mounted on an upper surface of an upper plate that covers the drive housing and the motor, a swivel bracket rotatably stacked and assembled on the seat swivel device, and an upper bracket stacked and assembled on the swivel bracket for assembly with a seat.

The upper plate may be mounted on the lower plate.

The slot may be formed at a corner position of the lower plate, and additional slots may be formed at other corner positions of the lower plate.

The upper rail device may further include a shaft passing through a hole formed to pass through the drive housing and the drive support in a vertical direction.

The drive shaft may be configured to pass through the shaft passing through the hole.

The reducer may be mounted on one side of the drive housing, and another reducer may be mounted on another side of the drive housing.

A vehicle seat may include the upper rail device.

A vehicle may include the upper rail device.

In another exemplary embodiment, an upper rail device for a seat of a vehicle includes a lower plate in which slots are formed at four corner positions of the lower plate, a drive housing movably mounted on an upper surface of the lower plate, a drive support formed to protrude from a bottom portion of the drive housing and configured to pass through the slot to be slidably inserted into a curved movement path of a lower rail, a shaft passing through hole formed to pass through the drive housing and the drive support in a vertical direction, a motor which is provided in a structure with reducers mounted on both sides and which is mounted on an upper surface of the drive housing, a drive shaft connected to an output portion of the reducer and inserted into to pass through the shaft passing through hole, a drive gear mounted on a lower end portion of the drive shaft and engaged with a driven gear mounted within the curved movement path of the lower rail, and an upper plate configured to cover the drive housing and the motor and mounted on the lower plate.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
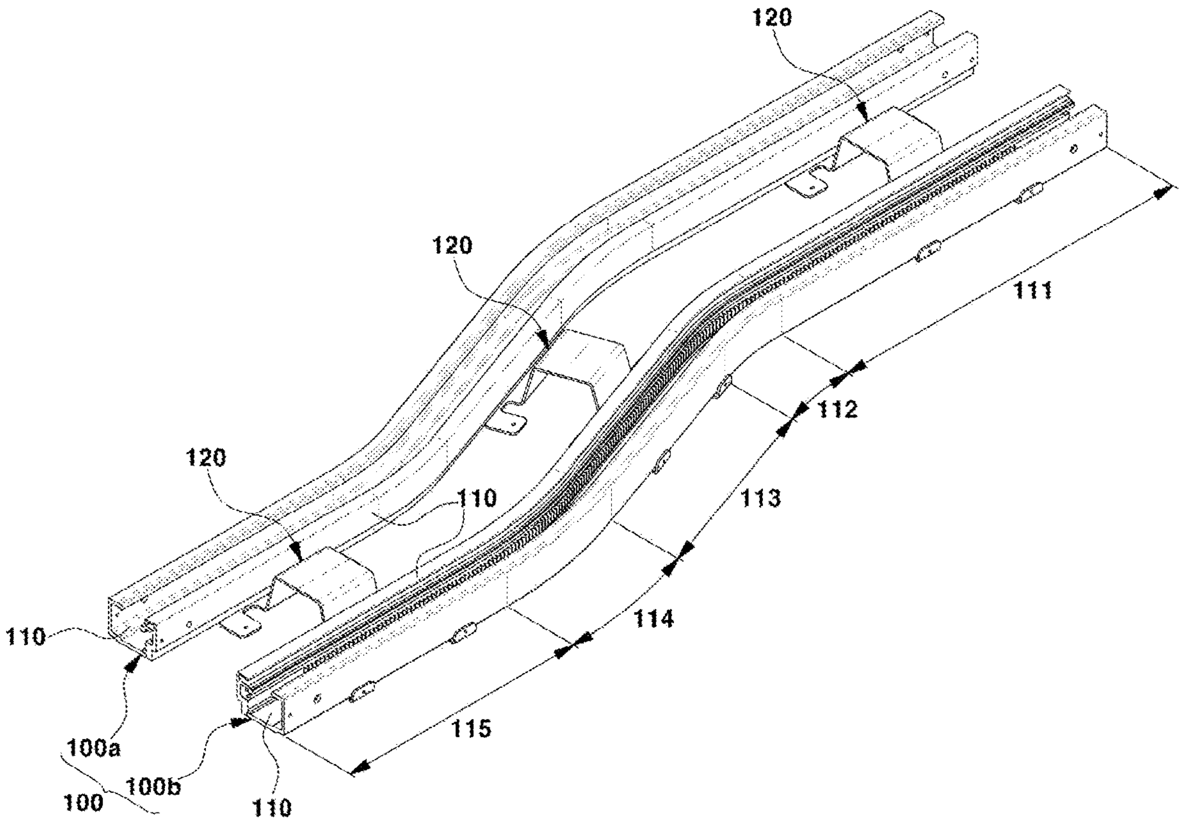
FIG. 1 is a perspective view illustrating a lower rail for a seat of a vehicle.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The specific structural and functional descriptions described in the embodiments of the present specification are merely illustrative for the purpose of describing the embodiments according to the concept of the present disclosure, and the embodiments according to the concept of the present disclosure can be implemented in various forms. In addition, the embodiments are not to be taken in a sense which limits the present disclosure to the specific embodiments, and should be construed to include modifications, equivalents, or substitutes within the spirit and technical scope of the present disclosure.

The terms first, second, and/or the like in the present specification may be used to describe various components, but the components are not limited by these terms. These terms may be used only for the purpose of distinguishing one component from another component, and, for example, a first component may be referred to as a second component, and similarly, the second component may also be referred to as the first component without departing from the scope of the present disclosure.

In the present specification, when a component is referred to as being "connected" or "coupled" to another component, it may be directly connected or coupled to another component, but it should be understood that sill another component may be present between the component and another component. On the contrary, when a component is referred to as being "directly connected to," or "directly in contact with" another component, it should be understood that still another component may not be present between the component and another component. Other expressions describing the relationship between components, that is, "between" and "immediately between," or "adjacent to" and "directly adjacent to" should also be construed as described above.

The same reference numerals denote the same elements throughout the present specification. Terms used herein are intended to describe embodiments and are not intended to limit the present disclosure. In the present specification, the singular forms include the plural forms unless the context clearly dictates otherwise.

Hereinafter, exemplary embodiments of the present disclosure will be described in detail with reference to the accompanying drawings.

First, in order to help understanding of the present disclosure, a configuration of a curved lower rail for a seat of a vehicle is as follows.

Figure 2:
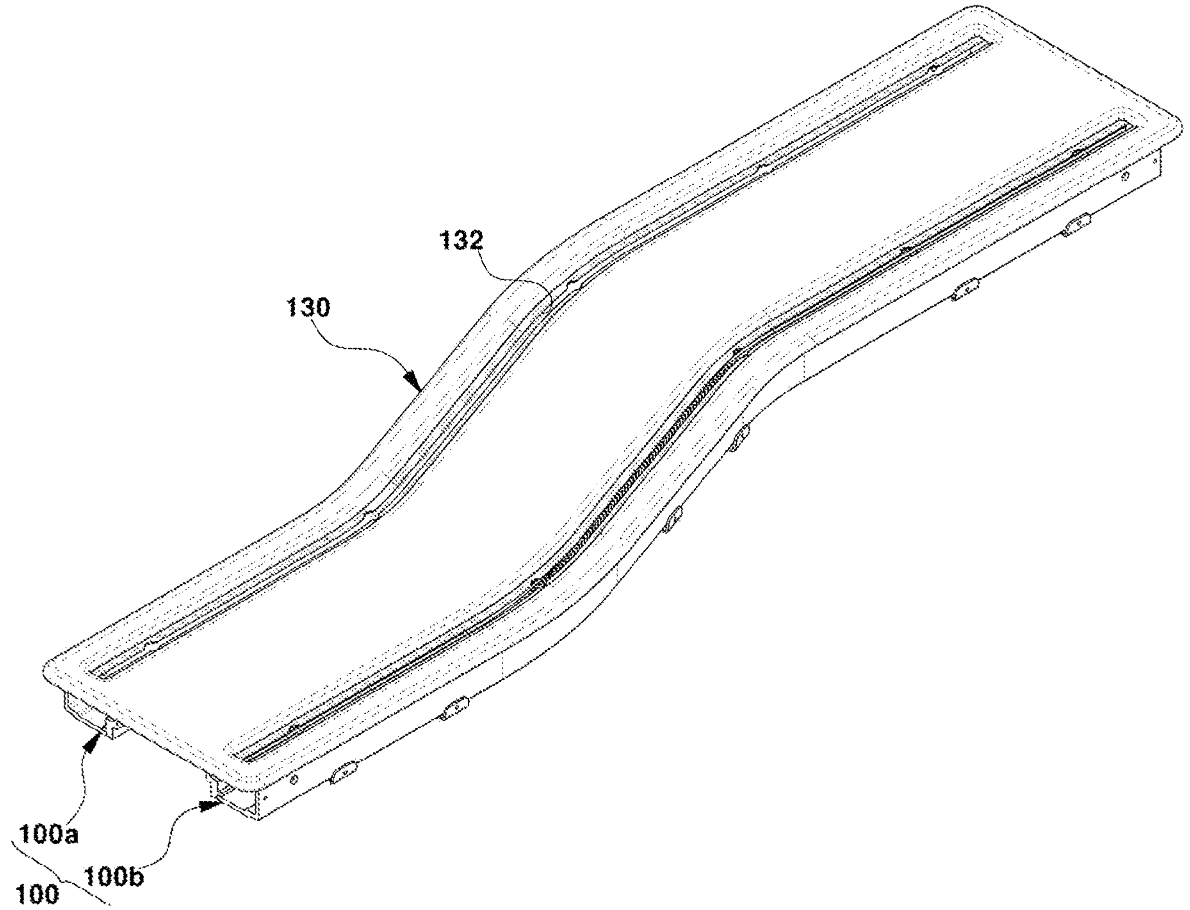
FIG. 2 is a perspective view illustrating a state in which a foreign materials blocking cover is attached to the lower rail.
Figure 3:
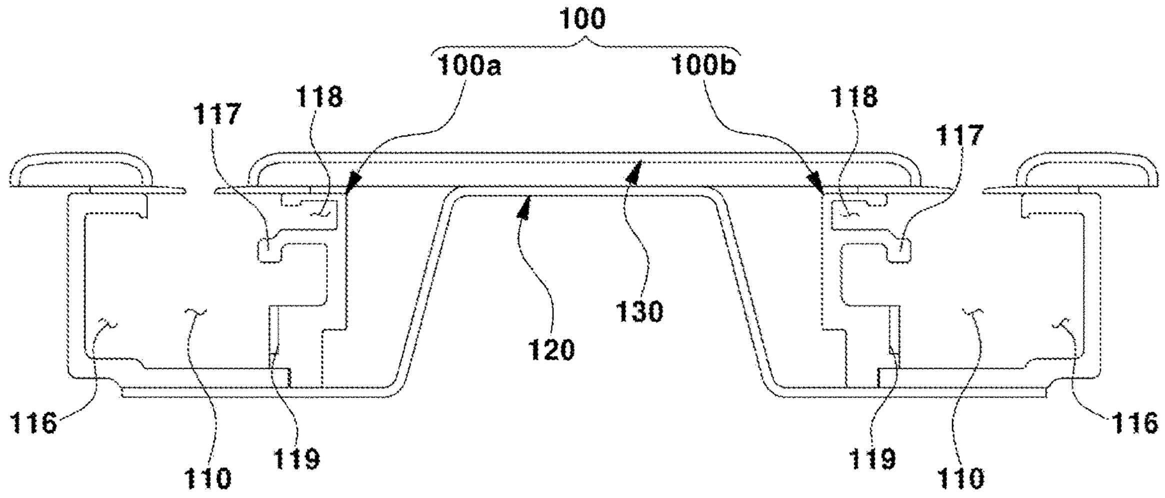
FIG. 3 is a cross-sectional view illustrating the lower rail.

FIGS. 1-3 show an example of a curved lower rail for a seat of a vehicle.

As shown in FIG. 1, a lower rail 100 according to the present disclosure may include a first lower rail 100*a* and a second lower rail 100*b* in which the same curved movement paths 110 are formed.

The first lower rail 100*a* and the second lower rail 100*b* are each manufactured in a structure whose upper portion is open to allow an upper rail to be slidably inserted into the curved movement path 110.

Preferably, the curved movement path 110 may be formed in a shape in which a first straight movement section 111, a first curve movement section 112, a diagonal movement section 113, a second curve movement section 114, and a second straight movement section 115 are continuously connected to be communicable with each other.

As shown in FIG. 1, the first lower rail 100*a* and the second lower rail 100*b* may be connected by connection brackets 120, and a width between the first lower rail 100*a* and the second lower rail 100*b* may be maintained constant by the connection brackets 120.

In addition, as shown in FIG. 2, a foreign materials blocking cover 130 for preventing foreign materials from infiltrating into the inside of the curved movement path 110 is stacked and assembled on an upper portion of the lower rail 100 including the first lower rail 100*a* and the second lower rail 100*b*.

In this case, incised holes 132 for communicating with the curved movement path 110*s* is formed in a length direction in the foreign materials blocking cover 130 to secure movement of the upper rail.

In addition, a sliding guide 117 for guiding the movement of the upper rail along the curved movement path 110 is formed to protrude from an upper portion of one inner wall surface in the inside of each of the first lower rail 100*a* and the second lower rail 100*b*.

In addition, a bus bar mounting groove 118 is formed above the sliding guide 117 in the inside of each of the first lower rail 100*a* and the second lower rail 100*b*.

Figure 8:
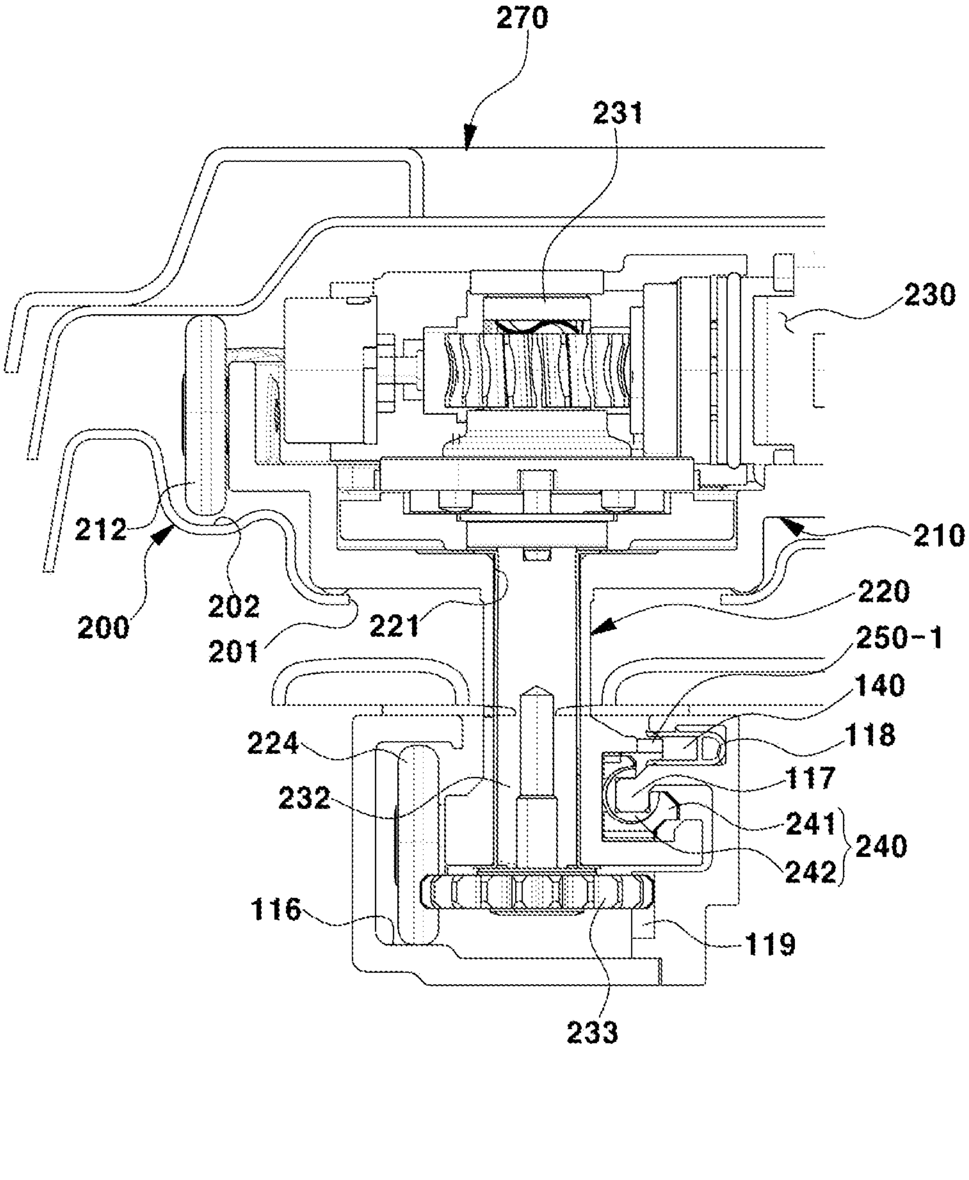
FIG. 8 is a longitudinal cross-sectional view illustrating a state in which the upper rail device according to the present disclosure is coupled to the lower rail.

In this case, as shown in FIG. 8, a bus bar 140, which is conductively connected to battery power by lines, is inserted into the bus bar mounting groove 118.

In addition, a rack gear 119 with which a pinion of the upper rail is engaged is integrally molded or separately manufactured and assembled at a lower portion of one inner wall surface in the inside of each of the first lower rail 100*a* and the second lower rail 100*b*.

In addition, a roller insertion space 116, into which a moving roller of the upper rail is inserted to be rolled, is formed on the other side in the inside of each of the first lower rail 100*a* and the second lower rail 100*b*.

The present disclosure is to provide the upper rail for a seat, which is engaged to enable sliding movement along the curved movement path 110 of the lower rail 100 provided with the above-described structure to move diagonally or obliquely the seat depending on the various purposes of use of the vehicle.

Here, a configuration of the upper rail for a seat of a vehicle according to the present disclosure will be described as follows.

Figure 4:
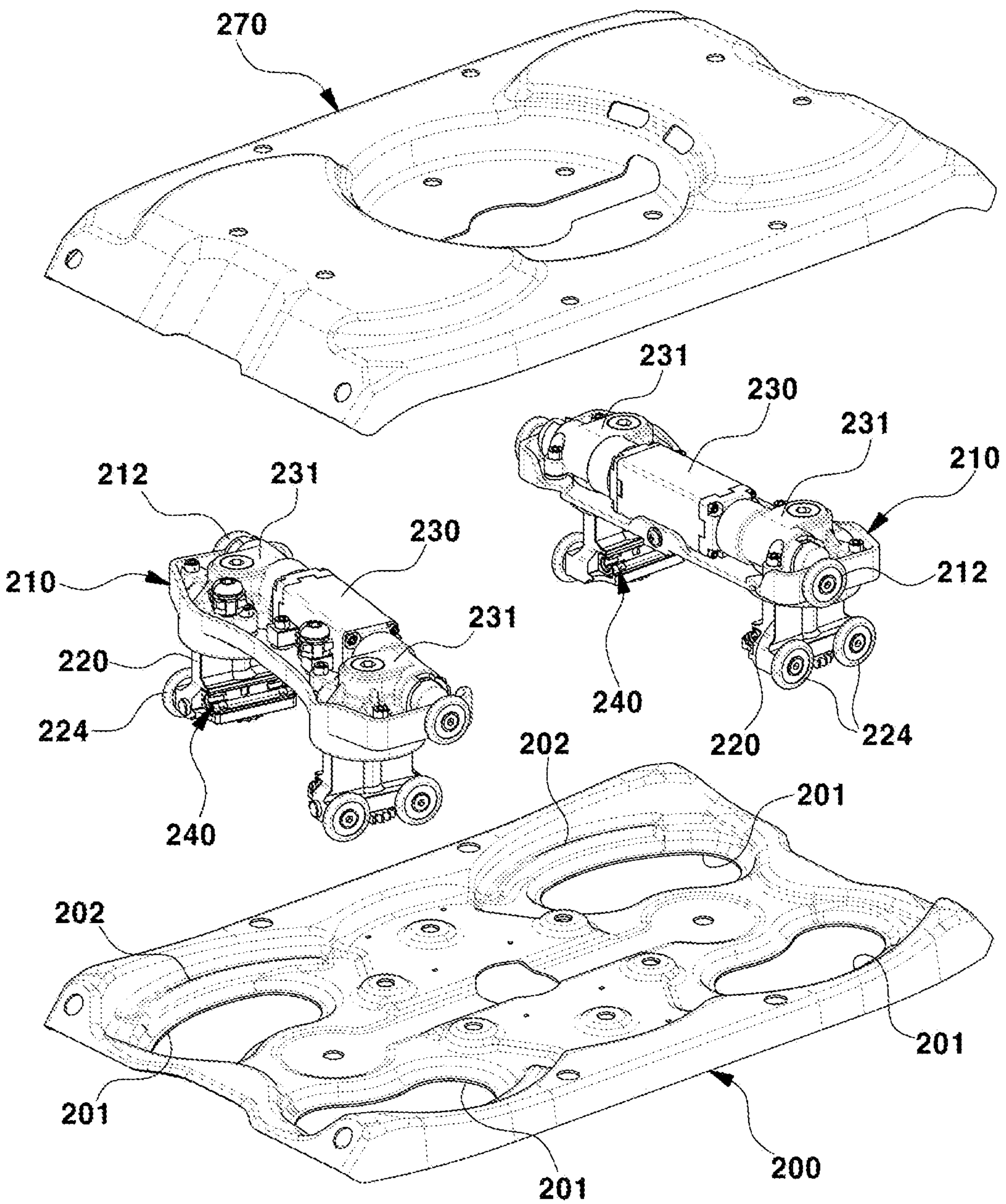
FIGS. 4 and 5 are separated perspective views illustrating an upper rail device for the seat of the vehicle according to the present disclosure.
Figure 5:
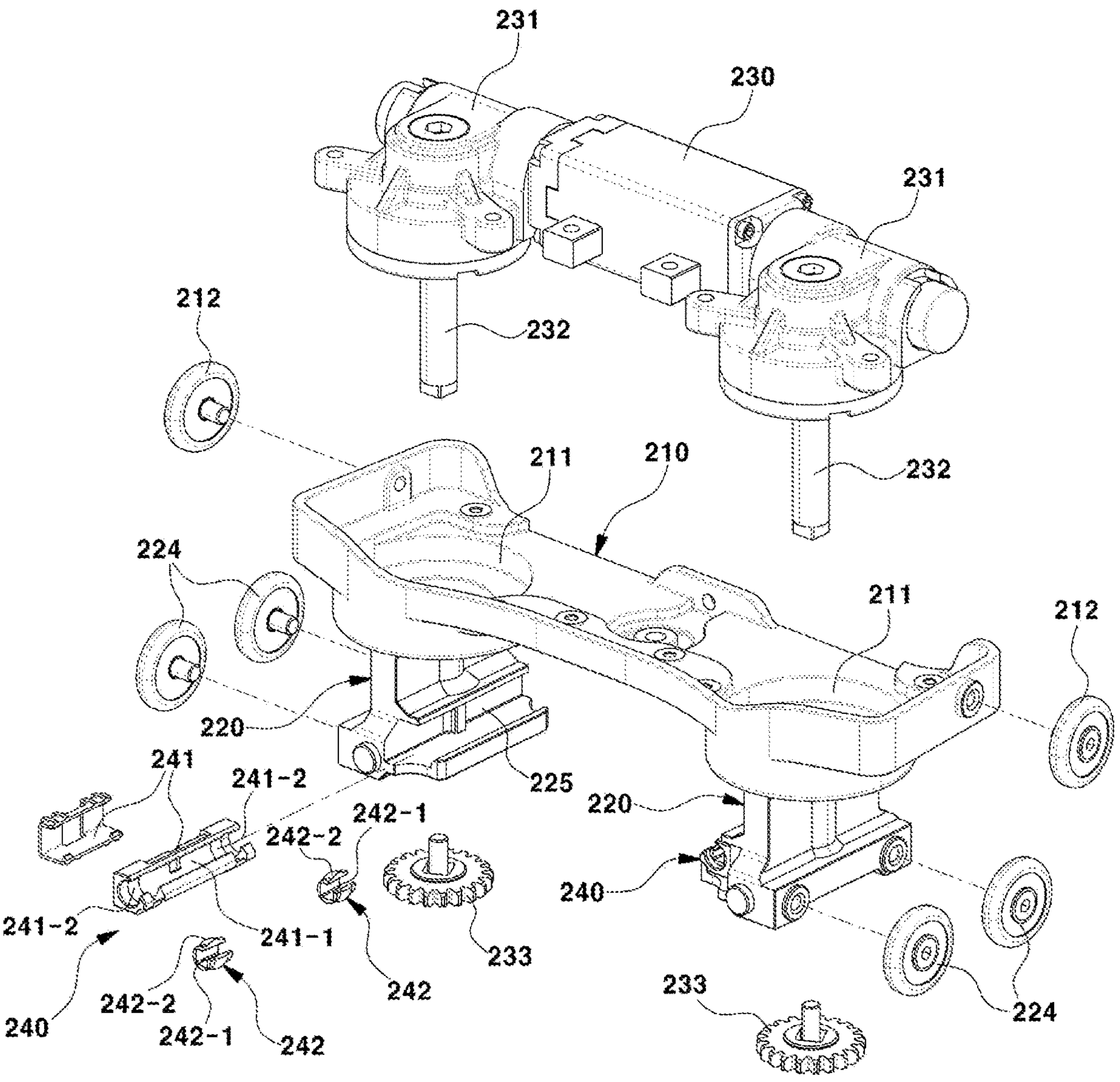
Figure 6:
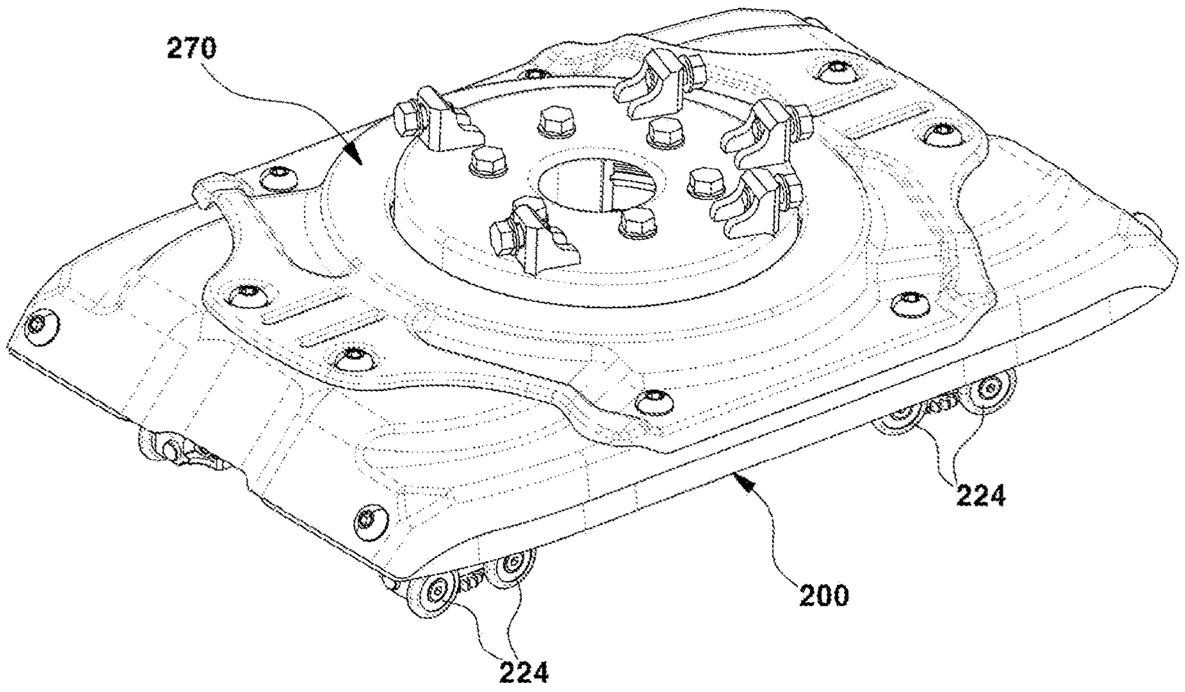
FIGS. 6 and 7 are assembled perspective views illustrating the upper rail device according to the present disclosure.
Figure 7:
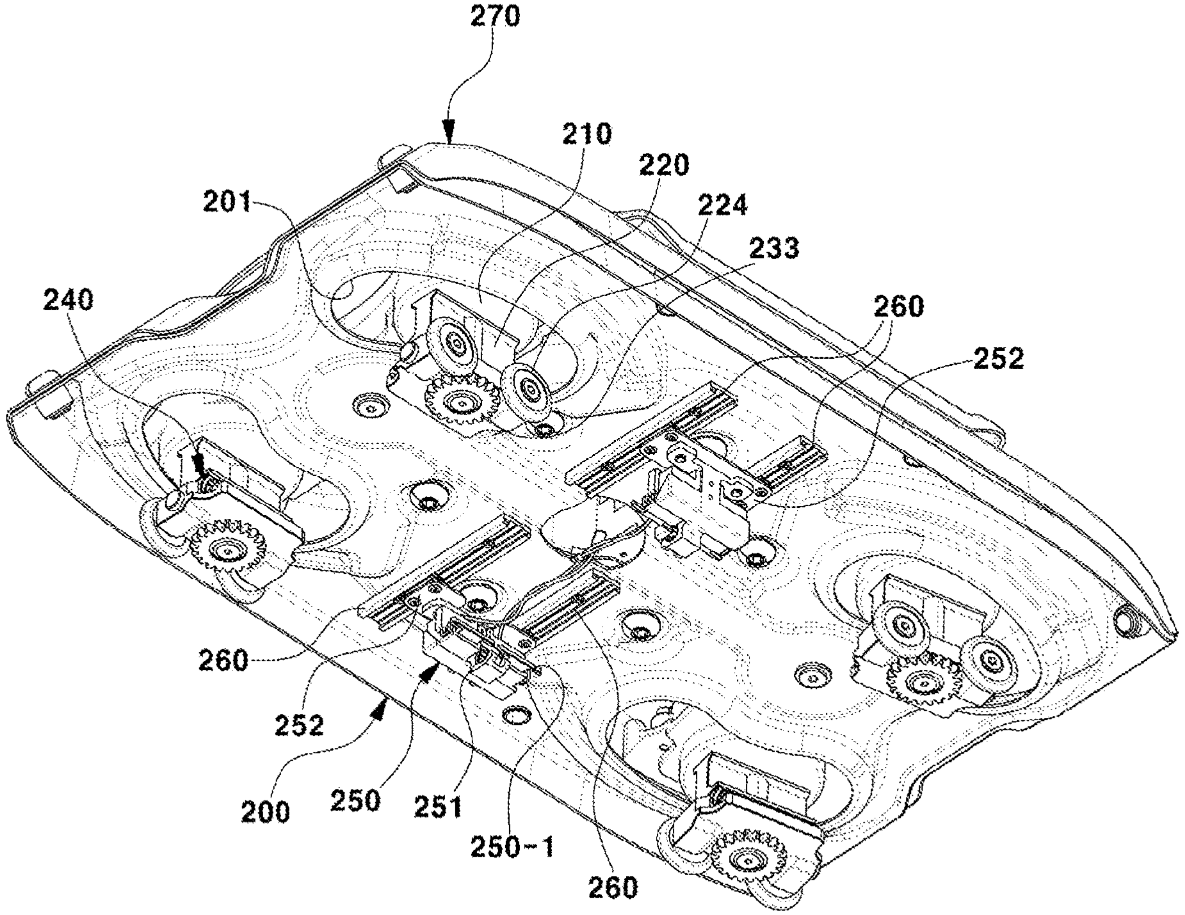

FIGS. 4 and 5 are separated perspective views illustrating an upper rail device for a seat of a vehicle according to the present disclosure, FIGS. 6 and 7 are assembled perspective views illustrating the upper rail device for a seat of a vehicle according to the present disclosure, and a reference numeral 200 indicates a lower plate in each drawing.

The lower plate 200 is provided in a structure in which slots 201 are formed to pass through four corner positions.

Figure 9:
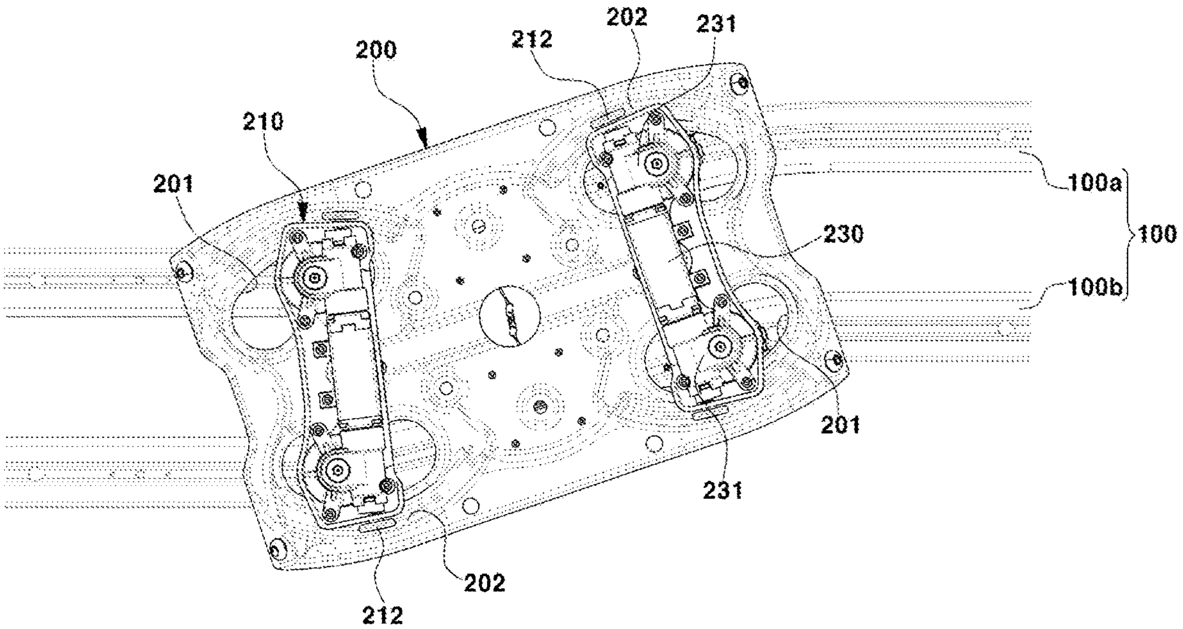
FIG. 9 is a transverse cross-sectional view illustrating a state in which the upper rail device according to the present disclosure is coupled to the lower rail.

In particular, as can be seen well in FIG. 9, the slot 201 of the lower plate 200 is formed as a curved slot which is long and convex outward in a front-rear direction for front-rear movement of a drive housing 210 and a drive support 220.

The drive housing 210 is provided in a structure in which a seating space 211 is formed to seat a motor 230 with a reducer 231 at the top of the seating space 211, and thus both ends of the drive housing 210 are movably mounted on an upper surface of the lower plate 200.

To this end, guide rollers 212 are mounted to be rolled on both sides of the drive housing 210 and come into close contact with peripheries of the slots 201 on the upper surface of the lower plate 200.

In addition, curved rail grooves 202, each having a length which defines a movement trajectory of the guide roller 212, are formed on the peripheries of the slots 201 on the upper surface of the lower plate 200.

Thus, a moving distance of the guide roller 212, which is mounted on each side of the drive housing 210 and is seated to be rolled in the curved rail groove 202 of the lower plate 200, may be limited to a length of the curved rail groove 202.

Drive supports 220, which pass through the slots 201 and are slidably inserted into the curved movement paths 110 of the lower rail 100, are integrally formed to protrude from both bottom surfaces of the drive housing 210.

In this case, a shaft passing through hole 221 is formed to pass through the drive housing 210 and the drive support 220 in a vertical direction.

Meanwhile, the motor 230 is seated in the seating space 211 of the drive housing 210, the motor 230 is provided with the reducers 231 mounted on both sides of the motor 230, and a drive shaft 232, which is a rotating output shaft, is connected to an output portion on a bottom surface of the reducer 231.

Thus, the drive shaft 232, which is the rotating output shaft of the reducer 231, may be inserted into the shaft passing through hole 221, and the motor 230 and the reducer 231 may be seated in the seating space 211 of the drive housing 210.

In this case, a driving gear 233 engaged with a driven gear mounted within the curved movement path 110 of the lower rail 100 is installed at a lower end portion of the drive shaft 232 passing through the shaft passing through hole 221.

Preferably, the driving gear 233 mounted on the lower end portion of the drive shaft 232 may employ a pinion, and the driven gear mounted within the curved movement path 110 of the lower rail 100 may employ the rack gear 119.

As described above, the rack gears 119 may be integrally formed on the lower portions of one inner walls within the curved movement paths 110 of the first lower rail 100*a* and the second lower rail 100*b* constituting the lower rail 100 or may be separately manufactured and assembled.

In addition, support rollers 224 are mounted on an outer surface of a lower end of the drive support 220 to be inserted and rolled into the roller insertion space 116 formed within the curved movement path 110 of the lower rail 100 and serve to guide the movement of the drive support 220 and, simultaneously, to support loads of the drive housing 210, the drive support 220, and the motor 230.

Therefore, when a rotational driving force of the motor 230 is transmitted to the drive shaft 232 through the reducer 231, the drive shaft 232 is rotated and, simultaneously, the driving gear 233 may be rotated to move along the rack gear 119. At the same time, since the support roller 224 is moved while being rolled along the roller insertion space 116, the drive support 220 may be eventually moved along the curved movement path 110 of the lower rail 100.

Meanwhile, a slider mounting groove 225 into which the slider 240 is inserted and mounted is formed on the inner surface of the lower end of the drive support 220.

The slider 240 serves to guide the drive support 220 to accurately move along straight and curved trajectories of the curved movement path 110 when the drive support 220 is moved on the curved movement path 110 of the lower rail 100.

Figure 10:
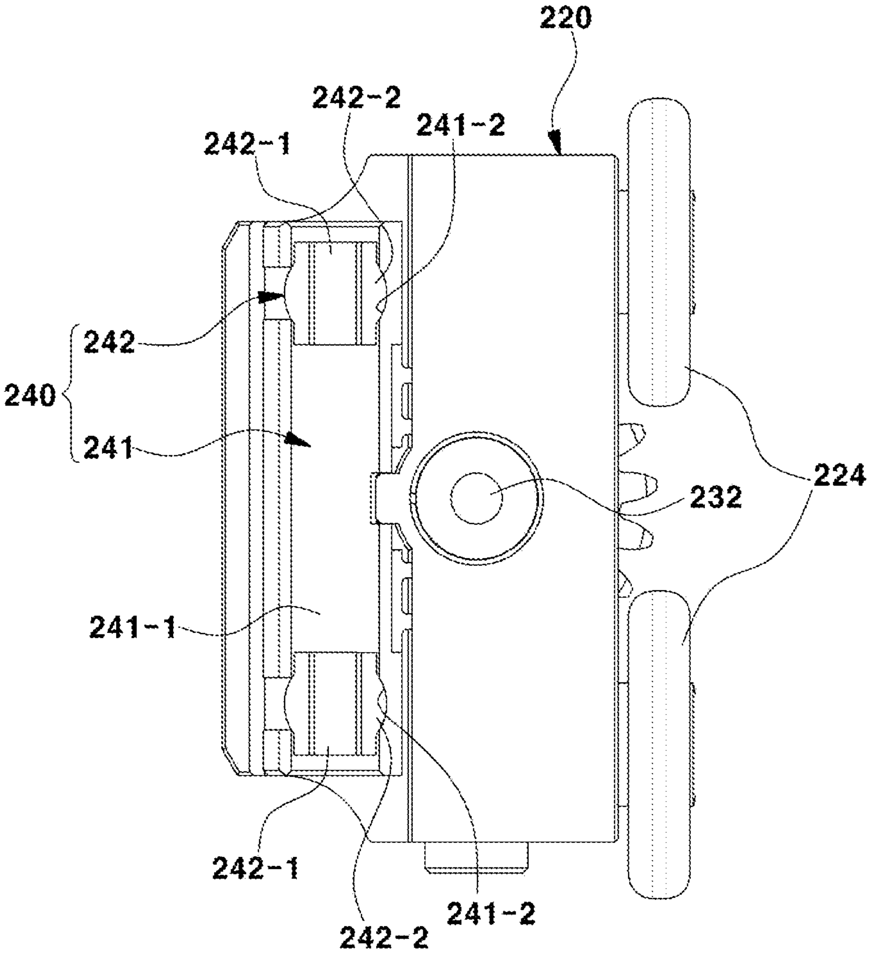
FIG. 10 is a transverse cross-sectional view illustrating an assembled state of a slider of the upper rail device according to the present disclosure.
Figure 11:
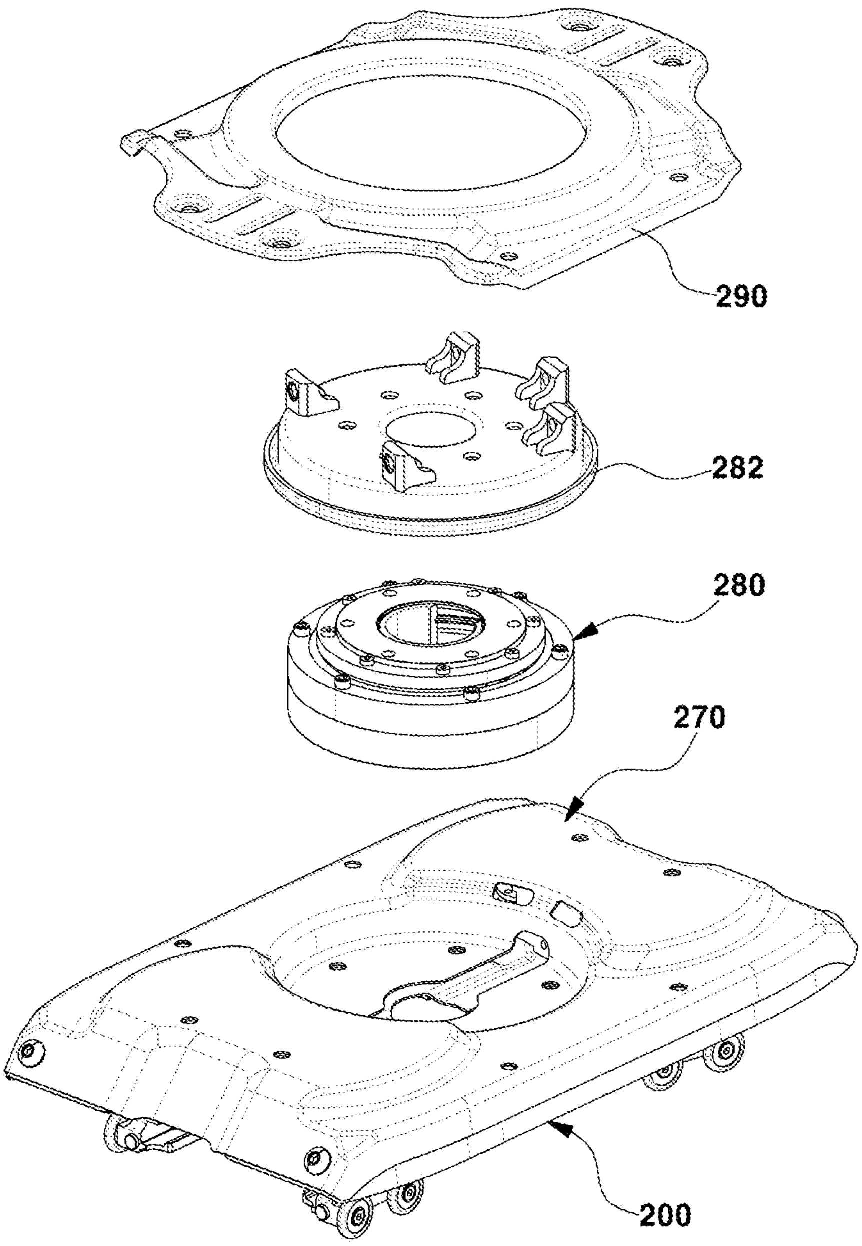
FIG. 11 is a perspective view illustrating a state in which a swivel device is further stacked on and assembled with the upper rail device according to the present disclosure.

To this end, as shown in FIGS. 4, 5, and 10, the slider 240 includes a slide housing 241 inserted into and mounted in the slider mounting groove 225 of the drive support 220, and a pair of slide bushes 242 rotatably inserted into and mounted in the slide housing 241 in a left-right direction.

The slide housing 241 is provided in a structure including a first slide groove 241-1 which is open outward to allow the sliding guide 117 formed in the curved movement path 110 of the lower rail 100 to be inserted and which passes through the slide housing 241 in the front-rear direction so that the slide housing 241 may be inserted into and mounted in the slider mounting groove 225 of the drive support 220.

The slide bush 242 is provided in a structure including a second slide groove 242-1 which is open outward to allow the sliding guide 117 formed in the curved movement path 110 of the lower rail 100 to be inserted and which is open in the front-rear direction so that the slide bush 242 may be rotatably inserted into and mounted in the first slide groove 241-1 of the slide housing 241 in the left-right direction.

In particular, a concave rotation guide groove 241-2 is formed on an inner wall surface of the first slide groove 241-1 of the slide housing 241, and a convex rotation block 242-2, which is rotatably inserted into the rotation guide groove 241-2 in the left-right direction, is formed to protrude from the inner surface of the slide bush 242.

Therefore, in a state in which the sliding guide 117 formed in the curved movement path 110 of the lower rail 100 is inserted into the first slide groove 241-1 of the slide housing 241 and the second slide groove 242-1 of the slide bush 242, when the drive support 220 is moved from a straight section to a curved section of the curved movement path 110 of the lower rail 100, as shown in FIG. 10, the slide bush 242 may be rotated in the left-right direction, and thus the drive support 220 may be easily moved along the curved movement path 110 of the lower rail 100.

In this case, since the convex rotation block 242-2 of the slide bush 242 is in a state of being rotatably inserted into the concave rotation guide groove 241-2 of the slide housing 241 like a ball joint, a rotation of the slide bush 242 in the left-right direction may be easily performed.

Meanwhile, as described above, in order to supply power to the motor 230, the bus bar 140, which is conductively connected to the battery power by lines, is inserted into and mounted in the bus bar mounting groove 118 formed in the curved movement path 110 of the lower rail 100, and a conductive brush 250-1 of a power supply brush 250, which is connected to the motor 230 by lines, is conductively brought into contact with the bus bar 140.

To this end, as shown in FIG. 7, the power supply brush 250 may be conductively brought into contact with the bus bar 140 mounted within the curved movement path 110 of the lower rail 100 and may be mounted on the bottom portion of the lower plate 200 to supply power to the motor 230.

In addition, the conductive brush 250-1, which is substantially conductively brought into contact with the bus bar 140, is attached to an upper portion of the power supply brush 250, and a guide groove 251 is formed at a lower portion of the power supply brush 250 to allow the sliding guide 117 formed within the curved movement path 110 of the lower rail 100 to be inserted.

In addition, a brush rail 260 is mounted on the bottom portion of the lower plate 200 in the width direction, and a slide stage 252 slidably engaged with the brush rail 260 is formed at the upper portion of the power supply brush 250.

Thus, since the sliding guide 117 formed within the curved movement path 110 of the lower rail 100 is in a state of being inserted into the guide groove 251 of the power supply brush 250, when the drive support 220 is moved along the curved movement path 110 of the lower rail 100 and, simultaneously, the lower plate 200 is moved in the same direction, the power supply brush 250 may also be moved together with the lower plate 200 in the same direction.

In particular, when the drive support 220 is moved from a straight section to a curved section or from the curved section to the straight section of the curved movement path 110 of the lower rail 100 and, simultaneously, the drive housing 210 and the lower plate 200 are moved together in the same direction, the slide stage 252 of the power supply brush 250 is compensatively moved along the brush rail 260 mounted on the bottom portion of the lower plate 200 in the width direction so that the power supply brush 250 may be easily moved together with the drive support 220 and the lower plate 200 in the same direction and along the same section.

In this case, the conductive brush 250-1 of the power supply brush 250 and the motor 230 are conductively connected through lines so that the battery power may be easily supplied to the motor 230 through the bus bar 140 and the conductive brush 250-1 of the power supply brush 250.

Meanwhile, as shown in FIGS. 4 and 6, an upper plate 270 for covering the drive housing 210 and the motor 230 may be stacked and assembled with the upper portion of the lower plate 200, and a seat swivel device 280 with a predetermined swivel mechanism (not shown) may be mounted on an upper surface of the upper plate 270.

In addition, a swivel bracket 282 may be rotatably stacked and assembled on the seat swivel device 280, an upper bracket 290 may be stacked and assembled on the swivel bracket 282, and a seat cushion (not shown) of the seat may be stacked and assembled on the upper bracket 290.

Here, an operation flow of the upper rail device having the above-described configuration according to the present disclosure will be described as flows.

Referring to FIG. 8, in a state in which the drive support 220 is slidably inserted into and engaged within the curved movement path 110 of the lower rail 100, the driving gear 233 mounted on the lower end portion of the drive shaft 232 is engaged with the rack gear 119 mounted within the curved movement path 110 of the lower rail 100.

In addition, the support roller 224 mounted on the outer surface of the lower end of the drive support 220 is positioned to be rolled in the roller insertion space 116 formed within the curved movement path 110 of the lower rail 100.

In addition, the guide rollers 212 mounted on both side portions of the drive housing 210 are seated to be rolled in the curved rail grooves 202 formed on the top portion of the lower plate 200.

In the above state, the upper rail including the lower plate 200, the drive housing 210, and the drive support 220 may be moved along the curved movement path 110 of the lower rail 100.

To this end, according to a turn-on operation of the switch (not shown), battery power is first supplied to the motor 230 through the bus bar 140 and the power supply brush 250.

Subsequently, when a rotational driving force of the motor 230 is transmitted to the drive shaft 232 through the reducer 231, the drive shaft 232 is rotated and, simultaneously, the driving gear 233 may be rotated to move along the rack gear 119. At the same time, since the support roller 224 is moved while being rolled along the roller insertion space 116, the drive support 220 may be eventually moved along the curved movement path 110 of the lower rail 100.

Of course, when the drive support 220 is moved along the curved movement path 110, the lower plate 200, the drive housing 210, the upper plate 270, the seat swivel device 280, and the upper bracket 290 may be moved together, and a seat stacked and assembled on the upper bracket 290 may also be moved in the same direction and along the same path.

For example, when the drive support 220 may be continuously moved along the first straight movement section 111, the first curve movement section 112, the diagonal movement section 113, the second curve movement section 114, and the second straight movement section 115 of the curved movement path 110, the lower plate 200, the drive housing 210, the upper plate 270, the seat swivel device 280, the upper bracket 290, and the seat stacked and assembled on the upper bracket 290 may be moved in the same direction and along the same path.

In this way, by engaging the upper rail with the curved movement path 110 of the lower rail 100 for a seat to be slidably moved, the seat mounted on the upper rail can be moved diagonally or obliquely according to the various purposes of use of the vehicle so that the degree of freedom in a seat position movement adjustment can be improved.

The present disclosure provides the following effects through the above-described problem solving means.

First, by engaging an upper rail with a curved movement path of a lower rail for a seat to be slidably moved, the seat mounted on the upper rail can be moved diagonally or obliquely according to the various purposes of use of the vehicle so that the degree of freedom in a seat position movement adjustment can be improved.

Second, by mounting a brush rail on a bottom portion of a lower plate of the upper rail and mounting a power supply brush, which is conductively brought into contact with a bus bar, on the brush rail, power can be easily supplied to a motor for sliding movement of the upper rail through the bus bar and the power supply brush.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, may further fall within the scope of the present disclosure.

What is claimed is:

1. An upper rail device for a seat of a vehicle, comprising:
a lower plate in which at least a slot is formed;
a drive housing movably mounted on an upper surface of the lower plate;
a drive support formed to protrude from a bottom portion of the drive housing and configured to pass through the slot to be slidably inserted into a curved movement path of a lower rail;
a motor provided in a structure with a reducer, the motor being mounted on an upper surface of the drive housing;
a drive shaft connected to an output portion of the reducer; and
a driving gear mounted on a lower end portion of the drive shaft and engaged with a driven gear mounted within the curved movement path of the lower rail.

2. The upper rail device of claim 1, wherein the slot of the lower plate is formed as a curved slot which is arranged in a front-rear direction and convex outward.

3. The upper rail device of claim 1, wherein guide rollers are mounted on both sides of the drive housing to be rolled in close contact with a periphery of the slot on the upper surface of the lower plate.

4. The upper rail device of claim 3, wherein a curved rail groove with a length defining a movement trajectory of the guide rollers is formed on the periphery of the slot on the upper surface of the lower plate.

5. The upper rail device of claim 1, wherein the driving gear mounted on the lower end portion of the drive shaft employs a pinion, and the driven gear mounted within the curved movement path of the lower rail employs a rack gear.

6. The upper rail device of claim 1, wherein a support roller, which is configured to be rolled in a roller insertion space formed within the curved movement path of the lower rail, is mounted on an outer surface of a lower end of the drive support.

7. The upper rail device of claim 1, wherein a slider mounting groove, into which a slider is inserted and mounted, is formed on an inner surface of a lower end of the drive support.

8. The upper rail device of claim 7, wherein the slider includes:

a slide housing provided in a structure including a first slide groove which is open outward to allow a sliding guide formed in the curved movement path of the lower rail to be inserted and which passes through the slide housing in a front-rear direction so that the slide housing is inserted into and mounted in the slider mounting groove of the drive support; and a slide bush provided in a structure including a second slide groove which is open outward to allow the sliding guide to be inserted and which is open in the front-rear direction so that the slide bush is rotatably inserted into and mounted in the first slide groove in a left-right direction.

9. The upper rail device of claim 8, wherein a concave rotation guide groove is formed on an inner wall surface of the first slide groove of the slide housing, and a convex rotation block is formed to protrude from an inner surface of the slide bush to be rotatably inserted into the rotation guide groove in the left-right direction.

10. The upper rail device of claim 1, wherein a power supply brush, which is conductively brought into contact with a bus bar mounted within the curved movement path of the lower rail to supply power to the motor, is mounted on the bottom portion of the lower plate.

11. The upper rail device of claim 10, wherein a brush rail is mounted at the bottom portion of the lower plate in a width direction, and a slide stage is formed above the power supply brush to be slidably engaged with the brush rail.

12. The upper rail device of claim 10, wherein a guide groove is formed at a lower portion of the power supply brush to allow a sliding guide formed within the curved movement path of the lower rail to be inserted.

13. The upper rail device of claim 1, further comprising:

a seat swivel device mounted on an upper surface of an upper plate that covers the drive housing and the motor;

a swivel bracket rotatably stacked and assembled on the seat swivel device; and an upper bracket stacked and assembled on the swivel bracket for assembly with a seat.

14. The upper rail device of claim 13, wherein the upper plate is mounted on the lower plate.

15. The upper rail device of claim 1, wherein the slot is formed at a corner position of the lower plate, and additional slots are formed at other corner positions of the lower plate.

16. The upper rail device of claim 1, further comprising a shaft passing through a hole formed to pass through the drive housing and the drive support in a vertical direction.

17. The upper rail device of claim 16, wherein the drive shaft is configured to pass through the shaft passing through the hole.

18. The upper rail device of claim 1, wherein the reducer is mounted on one side of the drive housing, and another reducer is mounted on another side of the drive housing.

* * * * *